UNITED STATES PATENT OFFICE.

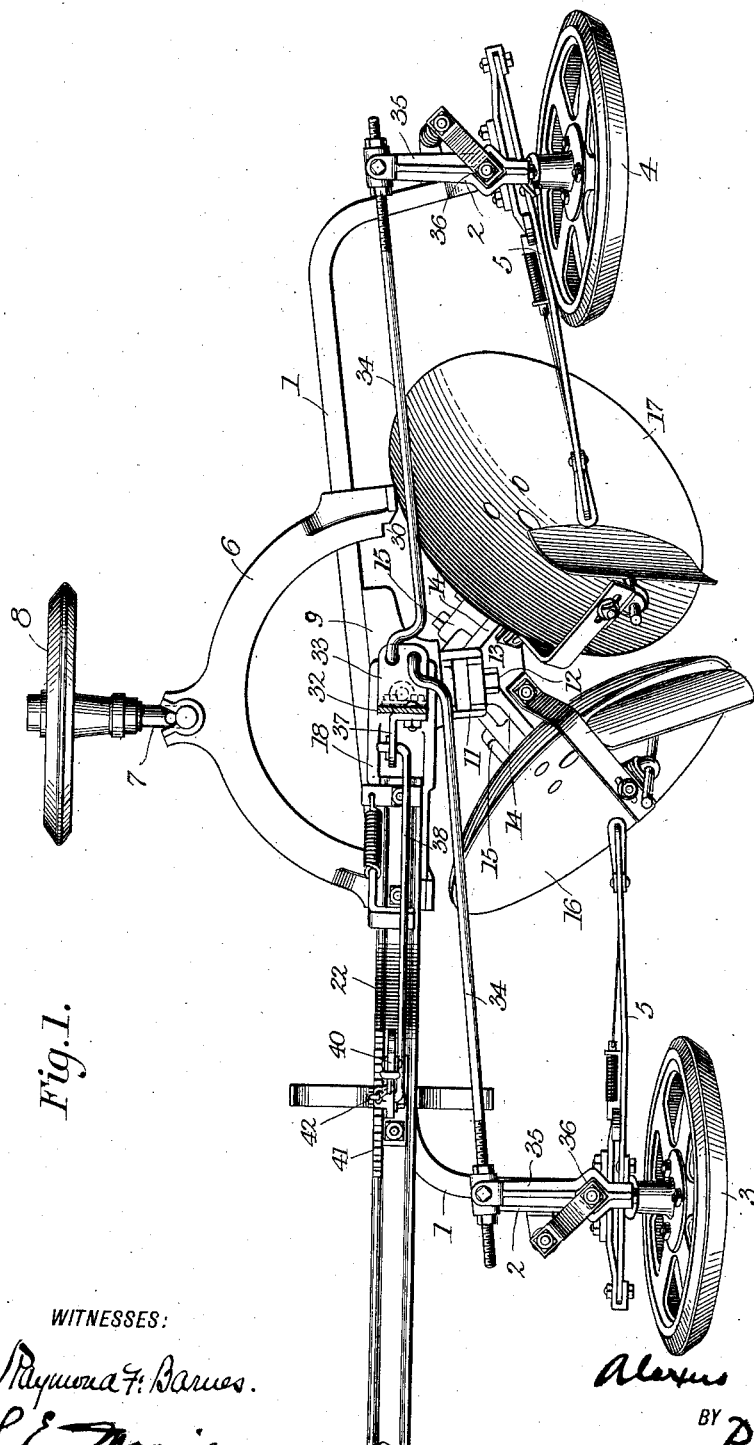

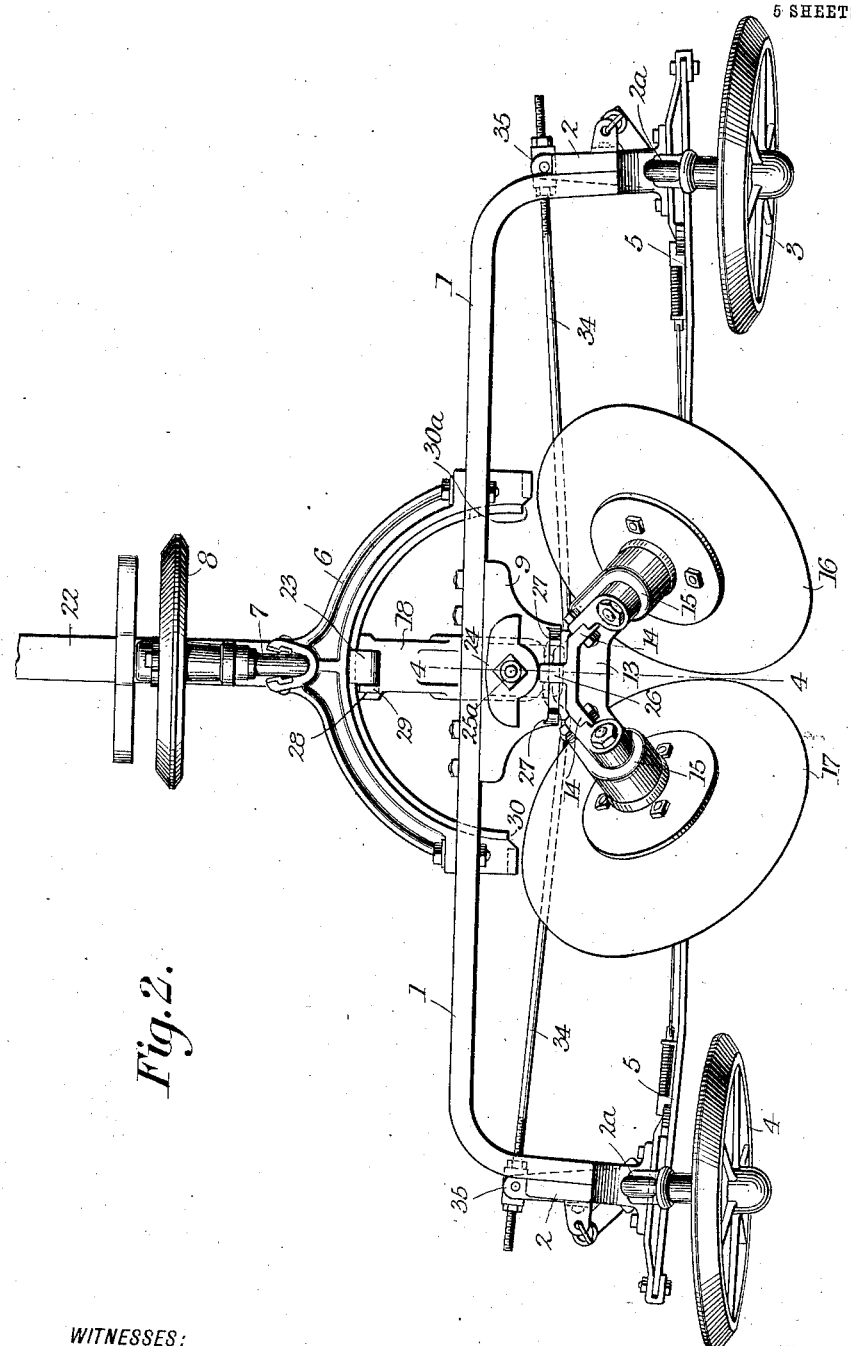

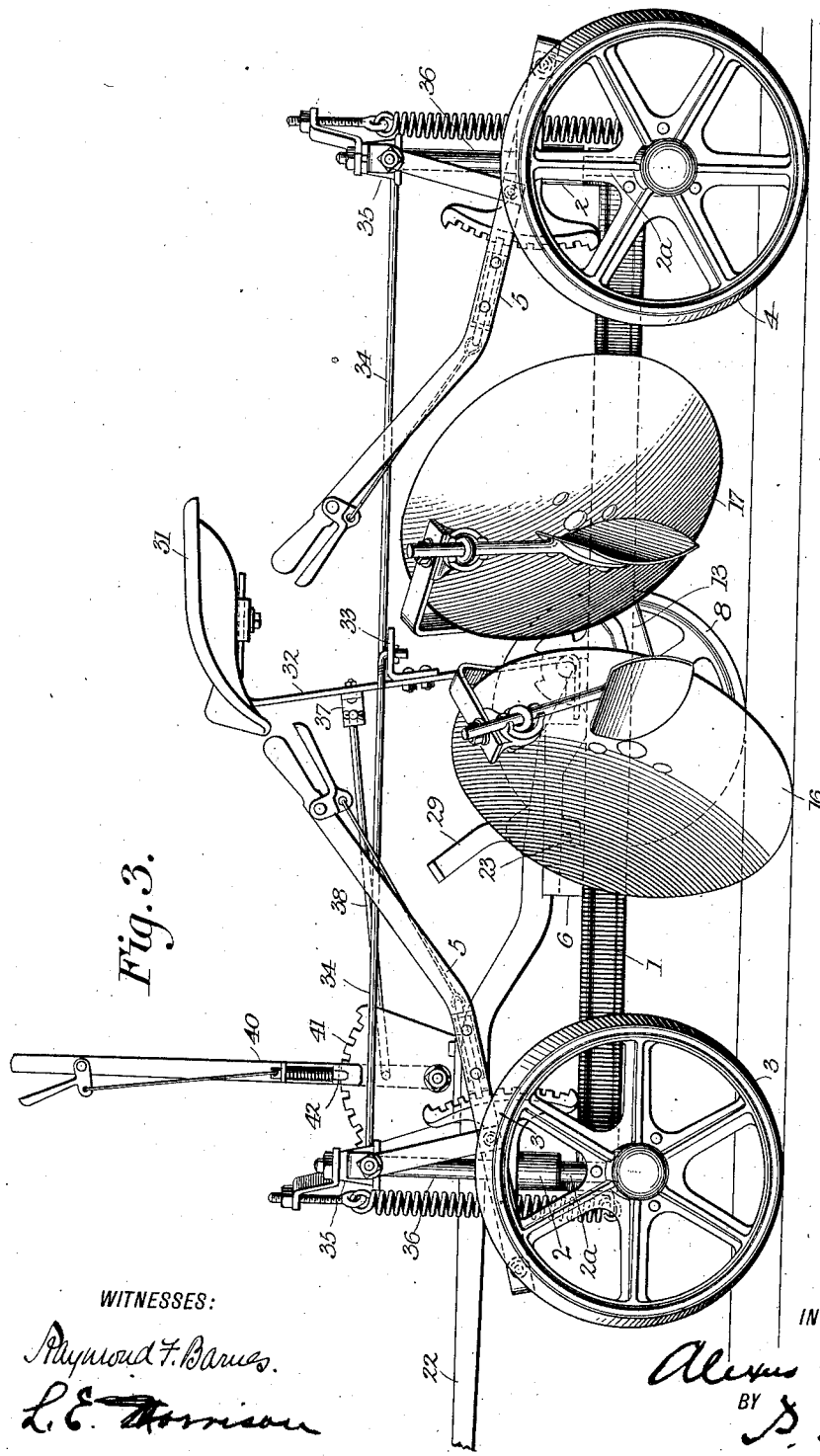

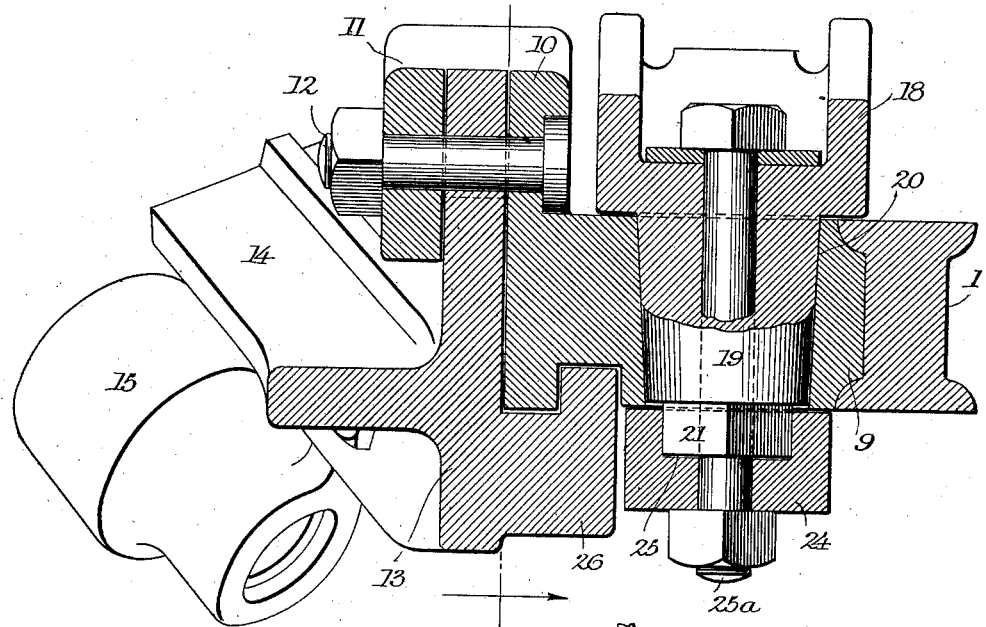
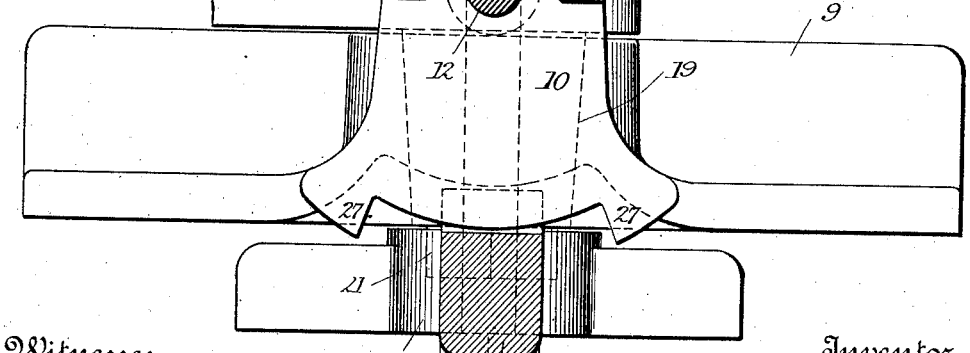

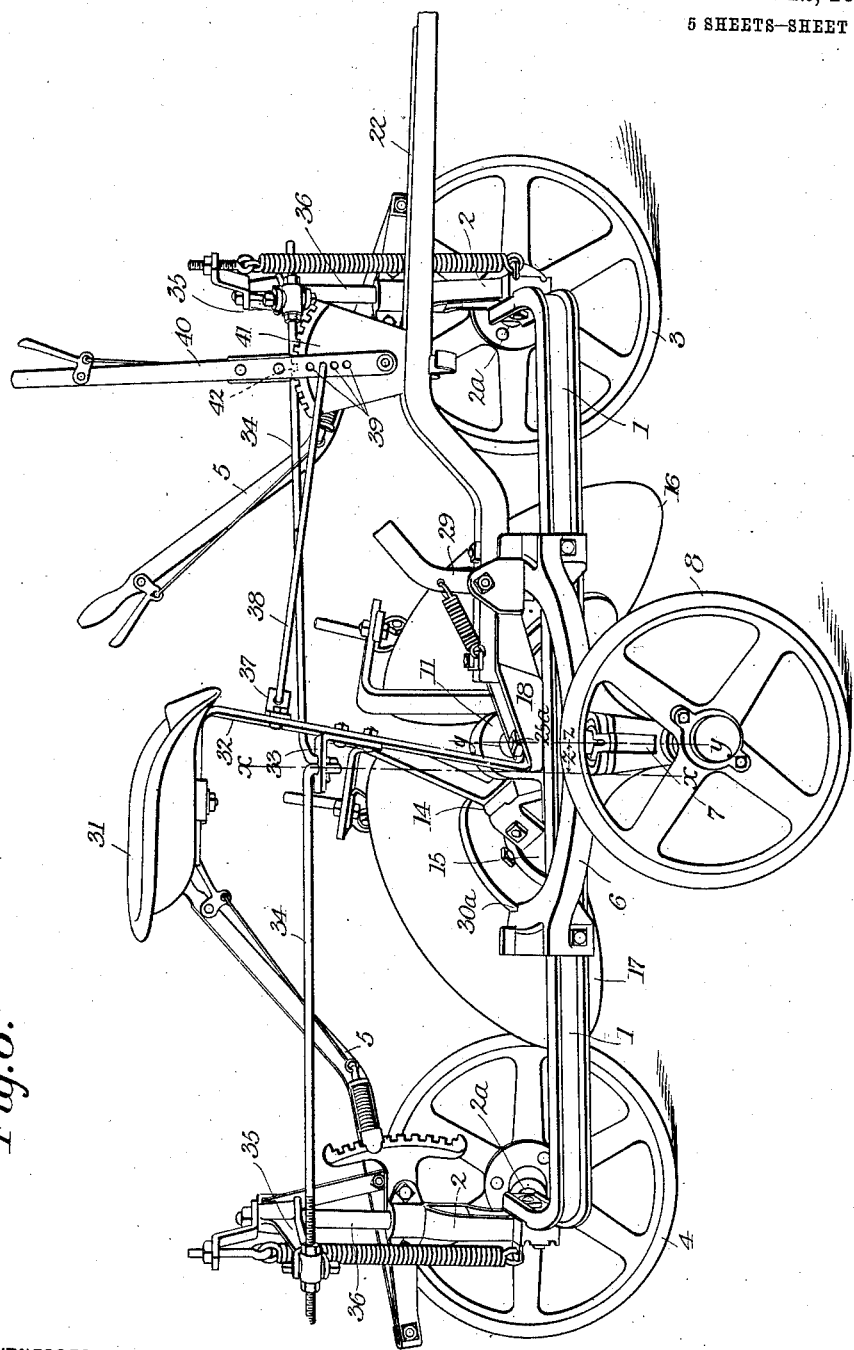

ALEXUS C. LINDGREN, OF MOLINE, ILLINOIS, ASSIGNOR TO MOLINE PLOW COMPANY, A CORPORATION OF ILLINOIS.

WHEELED PLOW.

1,044,203.  Specification of Letters Patent.  Patented Nov. 12, 1912.

Application filed June 2, 1909. Serial No. 499,666.

*To all whom it may concern:*

Be it known that I, ALEXUS C. LINDGREN, of Moline, county of Rock Island, and State of Illinois, have invented a new and useful Improvement in Wheeled Plows, of which the following is a specification.

This invention relates to wheeled plows and, particularly, to plows having a two-way draft for traveling in either direction without necessitating the turning of the plow at the end of a row.

The object of the invention is to provide a wheeled plow which comprises comparatively few parts and in which the positioning of two oppositely-facing rotary mold-boards is automatically effected alternately by the action of the draft-beam in swinging from one to the other of its operative positions.

With this and other objects in view, the invention resides in a wheeled plow consisting of a support and carrying two or more mold-board disks disposed on an oscillatory support common to both disks and adapted to be actuated by the draft-beam of the plow to alternately position the disks automatically toward and away from the ground.

The invention resides, also, in a wheeled supporting member upon a part of which two rotary mold-boards are sustained, each mold-board facing in the direction in which the plow is moved, and one of them being in action while the other is inactive and being adapted to be positioned away from the ground while said other is being positioned to the ground for action.

The invention consists, also, in a draft member or tongue mounted on a wheeled frame and reversible from one end to the other to change the direction of travel, two plowing disks mounted on the frame and adapted to travel in opposite directions and to be positioned alternately toward and away from the ground so that one may act, and then be rendered inactive while its companion disk is being positioned toward the ground for action, and connections between the disks and said draft-member whereby the automatic and alternate positioning of the disk is effected.

The invention consists, also, in a draft-beam mounted on a wheeled frame and reversible from one end of the frame to the other to change the direction of travel of the machine, a non-reversible disk set to plow as a right-hand plow and a non-reversible disk set to plow as a left-hand plow, the former being in position to plow when the draft-beam is pointing in one direction and the left-hand disk (then in the rear) is elevated out of operating position, and vice versa; the raising and lowering of the disks being effected automatically with the reversal of the draft-beam.

The invention consists, also, in novel means mounted on said supporting member and in the path of movement of the draft-beam and adapted to be actuated by the draft-beam automatically to position the mold-boards alternately toward and away from the ground.

The invention consists, also, in a certain novel combination and arrangement of parts, all as hereinafter fully described and claimed.

In the accompanying drawings: Figure 1 is a top plan view of a disk-plow embodying my invention. Fig. 2 is a bottom plan view thereof. Fig. 3 is a view in side elevation. Fig. 4 is a vertical sectional elevation on the line 4—4, Fig. 2. Fig. 5 is a vertical section on the line 5—5, Fig. 4. Fig. 6 is a perspective view from the land side of the machine.

Referring to the drawings, the numeral 1 designates a horizontally-extending supporting frame or bar curved laterally at opposite ends to provide means for the attachment of brackets 2 in which are supported swiveling and adjustable furrow-wheels 3 and 4; these being adjustably controlled, as usual, by lever-mechanism 5 of ordinary construction, and which being well understood in the art and forming no part of the present invention requires no detailed description. Suitably secured to one side of said supporting bar and midway of its ends is a semicircular member 6, its center extending outward from the bar and being provided with an axle-member 7 on which is mounted a land-wheel 8. This member 6 and the bar 1 constitute the frame of the machine.

Bolted to the supporting bar, on the furrow side or side opposite the semicircular member, is a large bearing-member 9, the diminished central portion of which extends away from the supporting-bar 1 and has a vertically extending portion 10 provided with an enlarged horizontal extension 11 through which passes a bolt 12. Loosely attached to this extension 11, and fulcruming on the bolt 12, (which constitutes a horizontal axis) is a disk-supporting bracket 13 provided with two radial extensions 14 to each of which is secured a disk-bearing-member 15, and in these are journaled the right-hand and left-hand disks 16 and 17. By reason of the fact that said bracket 13 operates on a horizontal axis, there is no upright movement of the disks, but only a tilting movement, whereby one is lowered while the other is tilted upwardly away from the ground.

Journaled in the large bearing-member 9, between the bar 1 and the vertically extending portion 10, is a beam-connecting member 18, the rear end of which is provided with a partially rounded depending stud 19 working in a large round hole 20 in the bearing-member, and having its lower end formed with a squared portion 21 which projects below the plane of the lower face of the member 9.

Upon the member 18 is secured the draft-beam or tongue 22 of the machine. Formed on the lower face of this member 18 is a depending guide 23 which slides on the inner periphery of the semicircular member 6, and tends to maintain the parts in proper relative position.

Carried by the lower squared end 21 of the stud 19 is a winged engaging-member 24 having a squared recess 25 in which the correspondingly formed end 21 of the stud 19 is seated, these parts being held together by a bolt 25$^a$ which extends through the beam-supporting member, the stud and the winged member. It will be understood that this winged member is rotated by the beam-connecting member, and that the latter is actuated by the draft-beam as it swings from one operative position to another. Disposed in the path of movement of the wings of said member, and carried on the under face of the disk-supporting member is a lug 26. The engagement of one of said wings with a rounded side of said lug actuates the disk-carrying member on its axis and thereby one of the disks is elevated from the ground while the other is lowered thereto.

As a means for limiting the movement of the disk-supporting bracket 13 when actuated, as explained, the vertically extending portion of the bearing-member 9 is provided, on its lower face with stop-lugs 27, at each side, against which the lug 26 engages, so that, while in plowing position, one of the wings will be in engagement with the lug 26 which, in turn will be in engagement with one or the other of said stop-lugs 27, whereby the disk-supporting bracket 13 and the disks which it sustains are held in a fixed position. When the draft-beam is swung to the opposite end, the wing which has been in contact with the lug is separated therefrom and the opposite wing is brought into engaging position with the lug and causes the disk-bracket to be actuated to raise the disk which has been active and to lower that which has theretofore occupied a position away from the ground. The beam-connecting member is provided with a vertical slot 28 adjacent the guide 23, and working in this slot is a spring-pressed latch 29, the lower end of which projects below the plane of the lower surface of said connecting-member and is adapted to engage in one or the other of two notches 30, 30$^a$ formed in the ends of semicircular member 6. By this means, the beam may be securely locked in position in either direction of draft during plowing. The position of the draft-beam therefore determines which of the disks is active and the movement of the former automatically positions a disk into or out of operating position. As there are two disks, the positioning of each is alternately effected.

By referring to Fig. 1, it will be seen that the disks are set in angular relations to the supporting or frame bar 1, and that, during the plowing operation, neither the disks nor said frame-bar are parallel with the line of draft. The draft-line may be taken as represented by the edge of the furrow or parallel with it; and the front furrow-wheel travels in the corner of a previously-made furrow, while the rear wheel travels in the corner of the furrow made by the acting disk; and this necessarily positions the frame-bar and the two disks at an angle to the draft-line and just that much out of a line parallel to the line of draft.

My invention is to be distinguished from those structures which employ a single reversible plowing disk and a connection between it and the draft-beam whereby by the movement of the latter the direction of the disk is reversed to plow in the opposite direction. In my construction, the disks are not reversible, but there are two disks which are alternately positioned, without reversing them, toward and away from the ground, and this alternate positioning is effected positively and automatically by the draft-beam, as distinguished from the operation of two disks in a machine which are actuated normally by lever-mechanism, and by which the disks are each adjusted in upright lines. In my construction, the draft-member does not actuate the disks into different elevations, but disposes them always in one definite position,—one in active position and the other in inactive position, and the positioning of one necessarily results in the reverse movement of the other by such automatic operation.

It will be understood that, when the plow has reached the end of the field, the beam-locking latch 29 is withdrawn by the driver to release the beam and permit the animals to swing it horizontally around to the opposite position; and that it is during this swinging movement of the beam that the disks are alternately positioned,—one into active position and the other into inactive position,—so that the direction of travel of the plow may thus be changed without turning the plow around.

The driver's seat 31 is supported on a seat-spring 32, the lower end of which is secured to the beam-supporting member 18, as shown in Fig. 6, so that the seat may be properly positioned thereby, the seat being thus reversed when the beam is reversed.

Mounted on the rear side of the seat-spring, somewhat below the seat, is an angular bracket 33. In this the ends of two oppositely extending connecting-rods 34 are pivoted, and each of which is adjustably jointed to a horizontally extending arm 35 mounted on the upper end of the upwardly extending portion 36 of the axle $2^a$ journaled in the bracket 2. Also mounted on the seat-spring, but on the front side thereof and somewhat above the bracket 33, is a second bracket 37, to which one end of a lever-rod 38 is pivotally connected, the other end of the rod being bent at an angle and projecting into one of a series of vertically alined holes 39 in a hand-lever 40, pivoted at its lower end to a segment-member 41 secured to the upper face of the beam. The upper edge of this member 41 is provided with a series of notches, in one or another of which a dog 42 carried by the lever 40 engages.

It is to be understood that when the seat-spring is reversed by the reversing movement of the beam, it will correspondingly change the horizontal position of the bracket 33, which, in its shifting movement, travels in an arc of a circle. This will result in actuating the connecting-rods 34 to move the arms attached to the axles and thereby turn said axles in their bearings and likewise turn the wheels. The supporting frame will thereby be disposed at an angle to the line of draft. In the intermediate position of the beam, the furrow-wheels will be parallel to the line of the beam, as shown in Fig. 2.

In Fig. 6 I have drawn a dotted line $x$—$x$ vertically through the fulcrum point on the bracket 33, and a second dotted line $y$—$y$ vertically through the vertical axis of the beam-supporting-member 18, and a third dotted line $z$—$z$ horizontally between the two vertical lines. When the beam is reversed to travel in the direction opposite to that in which it has been traveling, the line $x$—$x$ is shifted to the opposite side of the line $y$—$y$, and the position of the furrow-wheels and the supporting frame will be changed; that is to say, as these wheels had been traveling in different furrows (the front one in the previously cut furrow and the rear one in the new furrow, and which position of the wheels leaves them traveling in different but parallel paths), when the direction of travel of the plow is reversed, the angle of the wheels to the supporting frame and the position of said frame must necessarily be reversed. Consequently, the wheel which had traveled to the rear of the active disk and in the furrow made thereby will then be positioned to travel in the previously made furrow. This change in the line of travel of the wheels is automatically effected with the reversing of the draft-beam. It is accomplished by changing the location of the bracket 33 relative to the axis of the frame-supporting member 18. The greater the distance between the points indicated by the lines $x$—$x$ and $y$—$y$, the greater will be the angle of the wheels to the supporting bar and of the latter to the line of draft.

By means of the hand-lever 40, the position of the bracket may be adjusted to effect a change in the distance between the lines of travel of the furrow-wheels for taking more or less land, according to the adjustment effected. If the lever be moved rearward from the position shown in Fig. 6, the bracket and the seat-spring will be correspondingly moved rearward by reason of the inherent flexibility of said seat-spring, and the arms 35 will be shifted to turn the axles and furrow-wheels, causing the latter to travel toward the land and, thus, causing the plow to cut a wider furrow. Of course, it follows that if the hand-lever be pushed forward, it will position the wheels to cause the plow to cut less land. The lever is, as shown, conveniently arranged with reference to and in front of the driver. After once being set, the same reults, that is, the same relative positioning of the wheels, is effected when the direction of travel of the machine is reversed. This obviates the necessity of changing the lever each time a change in the direction of travel occurs. By this arrangement, the reversing of the beam results in automatically positioning the wheels as well as in automatically positioning the mold-boards, as already explained, and the positioning of the wheels is in relation to the position of the mold-boards.

While I have described my invention in detail, it is to be understood that the same is not limited to such details except in so far as such limitations are specified in the claims.

Having thus described my invention, and its construction and mode of operation, what

I claim and desire to secure by Letters Patent is:

1. In a wheeled plow, a two-way draft supporting frame provided with carrying wheels, a single disk-sustaining member pivotally mounted on the frame and provided with disk bearings, oppositely facing disks rotatably mounted in said bearings, and a reversible draft member movable to swing said member on its pivot for elevating one disk and lowering the other.

2. In a wheeled plow, a two-way draft supporting frame provided with carrying wheels, a single disk-supporting member pivotally mounted on said frame and provided with disk bearings, oppositely-facing disks rotatably mounted in said bearings, a reversible draft member, and means carried by said supporting and draft members; whereby when the latter is swung from one or the other of its operative positions, said supporting member will be swung on its pivot to elevate one disk and lower the other.

3. In a wheeled plow, a two-way supporting bar carrying furrow wheels adapted to travel in different furrows, a pivotally supported reversible draft-beam, a single oscillatory disk-supporting member disks mounted on said member, and means carried by said supporting member and operated by the movement of the draft-beam for swinging the same to elevate one disk and lower the other.

4. In a wheeled plow, a two-way supporting bar provided with carrying wheels adapted to travel in different furrows, a pivotally supported reversible draft beam, an oscillatory disk-supporting member provided with disk bearings, disks mounted in said bearings, means carried by said supporting member and operated by the movement of the draft beam for actuating the same to elevate one disk and lower the other, and a stop device adapted to be engaged directly by the said supporting member and acting to limit the oscillating movement of the latter.

5. In a wheeled plow, a two-way supporting bar, furrow wheels for supporting the same and traveling in different furrows, a pivot block carried by said bar, a reversible draft-beam pivotally mounted on said block, a single disk-supporting bracket pivoted on said block as a horizontal transverse axis, a winged member carried by the draft-beam and adapted to engage a lug formed on the disk-supporting bracket to oscillate the latter, and rotary disks carried by the disk-supporting bracket and movable thereby to raise one disk away from the ground and to lower the other thereto.

6. In a wheeled plow, a two-way supporting frame, a plow carrier pivoted to the frame on a horizontal transverse axis, a reversible draft beam mounted on the frame, a winged member carried by the draft beam, and a lug on the plow carrier adapted to be engaged on opposite sides alternately by the winged member as the draft beam is reversed to different positions.

7. In a wheeled plow, the combination of a frame, a movable furrow wheel, a reversible draft beam, an upright seat standard movable with the draft beam and movable also in relation thereto, a connection between said seat standard and the furrow wheel adapted to adjust the latter automatically when the beam is reversed, and means for adjusting the position of the seat standard in relation to the beam.

8. In a wheeled plow, the combination of a frame, a movable furrow wheel, a reversible draft beam, an upright resilient seat standard movable with the beam, a connection between the seat standard and the furrow wheel adapted to automatically adjust the furrow wheel when the beam is reversed, an adjusting lever on the frame, and a connection between the lever and the standard adapted when the lever is actuated, to deflect the standard with relation to the beam.

In testimony whereof I hereunto set my hand this 26th day of May, 1909, in the presence of two attesting witnesses.

ALEXUS C. LINDGREN.

Witnesses:
J. L. IRVING,
F. T. WINDLE.